No. 656,174. Patented Aug. 21, 1900.
T. M. CREPAR.
LANTERN ATTACHMENT.
(Application filed Dec. 22, 1899.)
(No Model.)
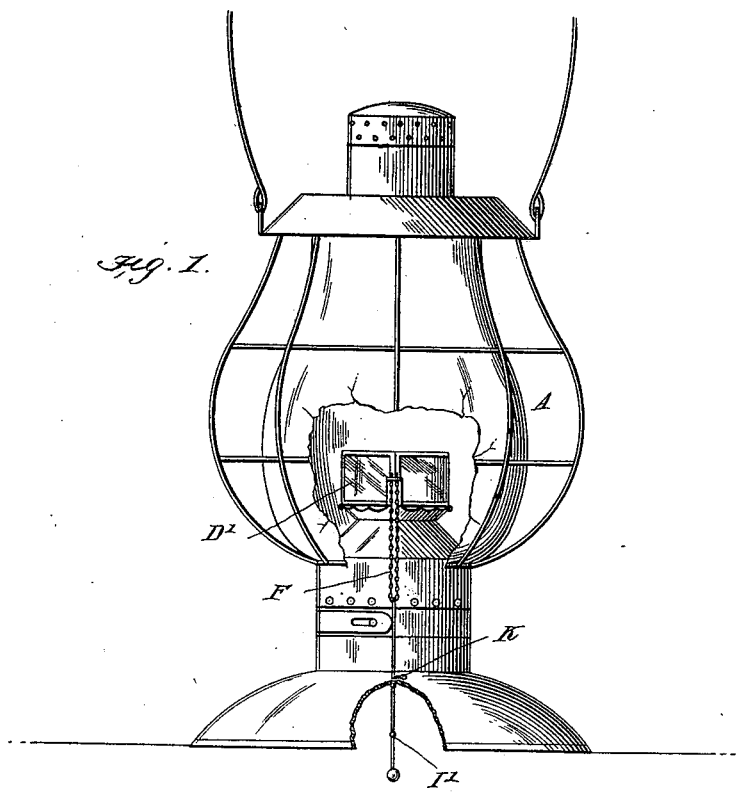
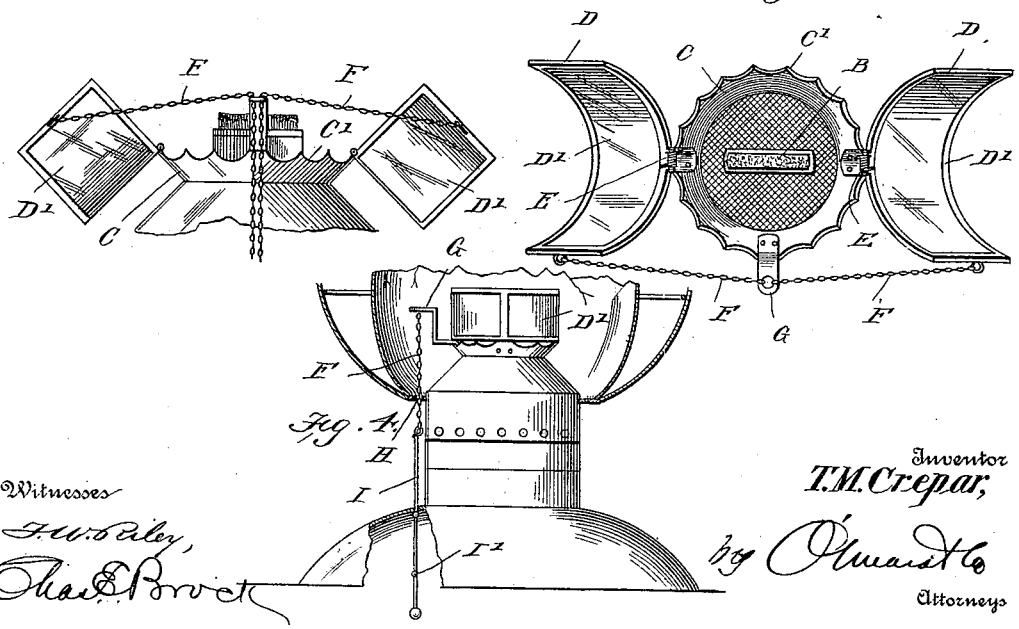
Witnesses
Inventor
T. M. Crepar,
Attorneys

UNITED STATES PATENT OFFICE.

THOMAS MORTIMER CREPAR, OF SWAN RIVER, MINNESOTA.

LANTERN ATTACHMENT.

SPECIFICATION forming part of Letters Patent No. 656,174, dated August 21, 1900.

Application filed December 22, 1899. Serial No. 741,290. (No model.)

*To all whom it may concern:*

Be it known that I, THOMAS MORTIMER CREPAR, a citizen of the United States, residing at Swan River, in the county of Itasca and State of Minnesota, have invented a new and useful Lantern Attachment, of which the following is a specification.

This invention is an improvement adapted to be used upon railroad-lanterns, one object being to provide means whereby the ordinary white light of a lantern can be changed into a red light for signal purposes, and another object is to provide an attachment by means of which one side can be made to show a red light and the other a green light.

With these objects in view the invention consists, essentially, in pivotally arranging frames upon opposite sides of the burner, said frames being curved, essentially, in the form of a semicircle and adapted to carry a colored glass, and means for moving the said frames to their open or closed positions, whereby a white light or a colored light is produced.

The invention consists also in certain details of construction and novelties of combination, all of which will be fully described hereinafter and pointed out in the claims.

In the drawings forming part of this specification, Figure 1 is a view showing the practical application of my invention, the frames being closed to produce a colored light and the globe and part of the base being broken away to clearly illustrate the operative parts of my invention. Fig. 2 is a detail view showing the frames carrying the colored glass open. Fig. 3 is a top plan view showing the frames in position indicated in Fig. 2; and Fig. 4 is a detail view, partly in section and partly in elevation, showing the position the parts occupy when the frames are closed.

In the practical embodiment of my invention I employ the ordinary construction of lantern A, the wick B being arranged as shown, and surrounding the said wick is arranged an outwardly-flaring collar C, the upper edges of which are scalloped, as shown at C', the purpose of which will appear hereinafter. The semicircular frames D are hinged at opposite sides of the flanged collar C, said frames carrying colored glass D', which glass may be colored red or green, as desired, or one of the frames may be made to carry red glass and the other green. The hinges are provided with springs E, the purpose of which is to throw the frames apart or open, as shown in Fig. 2, at which time a white light will be displayed within the lantern-globe. In order to bring the frames together, and thereby produce a colored light by surrounding the frame by the colored glass, I employ chains F, which are attached to the frames D at the sides of the same and pass through an eye or guide-frame G down through an opening H, produced in the globe-support of the lantern, and, if desired, these chains may be connected to a rod I, which passes down through a keyhole-slot K, produced in the base of the lantern, which rod is preferably provided with stops I' in order to lock the frames in the closed positions, as most clearly shown in Figs. 1 and 4. By having the flange or collar scalloped around the upper edge the frames carrying the colored glass will not interfere with the draft when the said frames are closed around the frame.

It will thus be seen that I provide an attachment which can be applied to any of the lanterns now in use and by means of which the ordinary white light can be transformed into a red, green, or other color light for signal purposes, and it will also be noted that the color attachments can be quickly and easily thrown out of use when not needed.

Having thus fully described my invention, what I claim as new, and desire to secure by Letters Patent of the United States, is—

1. A lantern attachment comprising an annular flange or collar, having glass-carrying frames hinged to opposite sides thereof, said hinges being provided with springs to normally hold them open and the chains for drawing the said frames together and surround the burner by the colored glass, substantially as shown and described.

2. A lantern attachment, the combination with an annular flange or collar having the upper edges thereof scalloped, of the essentially-semicircular frames hinged thereto and carrying colored glass, the springs arranged in connection with the hinges to normally throw the frames upon the chains connected to the frames and adapted to close the same, the guide-eye through which the chains pass, and the rod to which the chains are connected, said rod passing through a slot in the base and provided with stops, substantially as described.

THOMAS MORTIMER CREPAR.

Witnesses:
 H. L. BLACKSTONE,
 CHRIS MCDONOUGH.